United States Patent
Okuda

(10) Patent No.: US 11,404,214 B2
(45) Date of Patent: Aug. 2, 2022

(54) MULTILAYER CERAMIC CAPACITOR

(71) Applicant: Murata Manufacturing Co., Ltd., Nagaokakyo (JP)

(72) Inventor: Hikaru Okuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 126 days.

(21) Appl. No.: 17/015,737

(22) Filed: Sep. 9, 2020

(65) Prior Publication Data
US 2021/0104364 A1    Apr. 8, 2021

(30) Foreign Application Priority Data

Oct. 4, 2019  (JP) .............................. JP2019-184063

(51) Int. Cl.
*H01G 4/30* (2006.01)
*H01G 4/008* (2006.01)
*H01G 4/12* (2006.01)
*H01G 4/012* (2006.01)

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC ........... H01G 4/12; H01G 2/065; H01G 2/24; H01G 4/0085; H01G 4/012; H01G 4/20; H01G 4/2325; H01G 4/30; H01G 4/306; H01G 4/33; H01G 4/1227; H01G 4/248; H01G 4/1218; H01G 4/008
See application file for complete search history.

(56) References Cited

U.S. PATENT DOCUMENTS

| 9,236,185 | B1* | 1/2016 | Oguni ..................... C04B 35/49 |
| 2001/0019176 | A1* | 9/2001 | Ahiko .................... H01G 4/232 |
| | | | 257/772 |
| 2006/0245141 | A1* | 11/2006 | Shirasu ................. H01G 4/012 |
| | | | 361/303 |
| 2011/0157766 | A1 | 6/2011 | Cho et al. |
| 2012/0073129 | A1* | 3/2012 | Abe ........................ H01G 4/30 |
| | | | 29/825 |

(Continued)

FOREIGN PATENT DOCUMENTS

| JP | 2003-022930 A | 1/2003 |
| JP | 2004-179531 A | 6/2004 |

(Continued)

*Primary Examiner* — Michael P McFadden
(74) *Attorney, Agent, or Firm* — Keating & Bennett, LLP

(57) ABSTRACT

When internal electrode layers are viewed in a stacking direction, the internal electrode layers include an internal electrode main body portion defining an effective region, and an internal electrode lead-out portion that leads to a first or second end surface of a stacked body, and a length of the internal electrode lead-out portion in a width direction of the stacked body is less than or equal to about ½ of a length of the internal electrode main body portion. The internal electrode layer includes a first region having relatively high continuity of a conductive component defining the internal electrode layer, and a second region having relatively continuity of the conductive component. A central portion of the internal electrode main body portion is defined by the first region, and a portion of the internal electrode lead-out portion is defined by the second region.

20 Claims, 7 Drawing Sheets

(56) References Cited

U.S. PATENT DOCUMENTS

| | | | | |
|---|---|---|---|---|
| 2013/0094118 A1* | 4/2013 | Kim | ....................... | H01G 4/30 361/301.4 |
| 2015/0116898 A1 | 4/2015 | Takashima et al. | | |
| 2017/0345571 A1* | 11/2017 | Imaeda | .................. | H01G 4/248 |
| 2018/0068797 A1* | 3/2018 | Chigira | .................. | H01G 4/008 |
| 2018/0294101 A1* | 10/2018 | Inoue | ................... | H01G 4/1227 |

FOREIGN PATENT DOCUMENTS

| | | |
|---|---|---|
| JP | 2007-208112 A | 8/2007 |
| JP | 2015-111651 A | 6/2015 |
| KR | 10-2011-0073989 A | 6/2011 |

\* cited by examiner

MULTILAYER CERAMIC CAPACITOR

CROSS REFERENCE TO RELATED APPLICATIONS

This application claims the benefit of priority to Japanese Patent Application No. 2019-184063 filed on Oct. 4, 2019. The entire contents of this application are hereby incorporated herein by reference.

BACKGROUND OF THE INVENTION

1. Field of the Invention

The present invention relates to a multilayer ceramic capacitor.

2. Description of the Related Art

As an example of a multilayer ceramic capacitor, Japanese Patent Laying-Open No. 2004-179531 discloses a multilayer ceramic electronic component having a structure in which a plurality of internal electrodes are arranged to face each other with a ceramic layer interposed therebetween in a ceramic element, and the internal electrodes facing each other are alternately led out to opposite end surfaces of the ceramic element and connected to external electrodes formed at the end surfaces, wherein each internal electrode lead-out portion is formed as a taper-shaped portion having a width that gradually becomes narrower toward the end surface of the ceramic element to prevent moisture intrusion into the ceramic element.

The multilayer ceramic capacitor described in Japanese Patent Laying-Open No. 2004-179531 is fabricated, for example, by stacking, compression-bonding, and firing ceramic green sheets each having an internal electrode printed thereon, and thereafter forming the external electrodes.

In order to improve the capacitance of a multilayer ceramic capacitor, it is conceivable to decrease the thickness of a dielectric layer that insulates internal electrodes, and decrease the distance between the internal electrodes. However, decreasing the thickness of the dielectric layer causes a reduction in the insulation property between the internal electrodes, and a reduction in the insulation resistance of the multilayer ceramic capacitor.

SUMMARY OF THE INVENTION

Preferred embodiments of the present invention provide multilayer ceramic capacitors that are each able to significantly reduce or prevent a reduction in insulation resistance even when dielectric layers have a thin thickness.

A multilayer ceramic capacitor according to a preferred embodiment of the present invention includes a stacked body including a plurality of dielectric layers and a plurality of internal electrode layers stacked alternately, and including a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the length direction; and external electrodes provided on the surfaces of the stacked body and electrically connected with the internal electrode layers, wherein the dielectric layers have an average thickness of less than or equal to about 0.5 µm; when the internal electrode layers are viewed in plan view from the stacking direction, the internal electrode layers each have an internal electrode main body portion that defines and functions as an effective region, and an internal electrode lead-out portion that leads out the internal electrode main body portion to the first end surface or the second end surface of the stacked body, and a length of the internal electrode lead-out portion in the width direction of the stacked body is less than or equal to about ½ of a length of the internal electrode main body portion; the internal electrode layer has a first region in which continuity of a conductive component defining the internal electrode layer is relatively high, and a second region in which continuity of the conductive component is relatively low; a substantially central portion of the internal electrode main body portion is defined by the first region; and at least a portion of the internal electrode lead-out portion is defined by the second region.

A multilayer ceramic capacitor according to a preferred embodiment of the present invention includes a stacked body including a plurality of dielectric layers and a plurality of internal electrode layers stacked alternately, and including a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the length direction; and external electrodes provided on the surfaces of the stacked body and electrically connected with the internal electrode layers, wherein the dielectric layers have an average thickness that is less than or equal to about 3.4 times an average grain diameter of dielectric grains defining the dielectric layers; when the internal electrode layers are viewed in plan view from the stacking direction, the internal electrode layers each have an internal electrode main body portion that defines and functions as an effective region, and an internal electrode lead-out portion that leads out the internal electrode main body portion to the first end surface or the second end surface of the stacked body, and a length of the internal electrode lead-out portion in the width direction of the stacked body is less than or equal to about ½ of a length of the internal electrode main body portion; the internal electrode layer has a first region in which continuity of a conductive component defining the internal electrode layer is more than or equal to a predetermined threshold value, and a second region in which continuity of the conductive component is less than the predetermined threshold value; a substantially central portion of the internal electrode main body portion is defined by the first region; at least a portion of the internal electrode lead-out portion is defined by the second region; when the internal electrode main body portion is equally or substantially equally divided into five regions in the length direction, in a cut surface along which the stacked body is cut in a direction that is parallel or substantially parallel to the length direction and the stacking direction and is perpendicular or substantially perpendicular to the width direction, at an end portion of the internal electrode main body portion closer to the first side surface, and the regions are set as a region La, a region Lb, a region Lc, a region Ld, and a region Le in order from the first end surface, continuity of the conductive component of the internal electrode layer in the region Lc is higher than continuity of the conductive component of the internal electrode layer in each of the region La and the region Lb; and when the internal electrode main body portion is equally or substantially equally divided into five regions in the length direction, in a cut surface along which the stacked body is cut in the direction that is parallel or substantially parallel to the length direction and the stacking direction and is perpendicular or substantially perpendicular to the width direction, at each of a position shifted by about 20 μm from the end portion of the internal electrode main body portion closer to the first side surface toward the second side surface and a central position of the internal electrode main body portion in the width direction, continuity of the conductive component of the internal electrode layer in a region closer to the first end surface is lower than continuity of the conductive component of the internal electrode layer in a substantially central region of the internal electrode main body portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention will be described.

However, the present invention is not limited to the following components, elements, and structures, and may be modified within the scope not changing the gist of the present invention and applied. It should be noted that a combination of two or more individual features described below is also included in the present invention.

A multilayer ceramic capacitor according to a preferred embodiment the present invention includes a stacked body including a plurality of dielectric layers and a plurality of internal electrode layers stacked alternately, and including a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the length direction; and external electrodes provided on the surfaces of the stacked body and electrically connected with the internal electrode layers.

Figure 1:
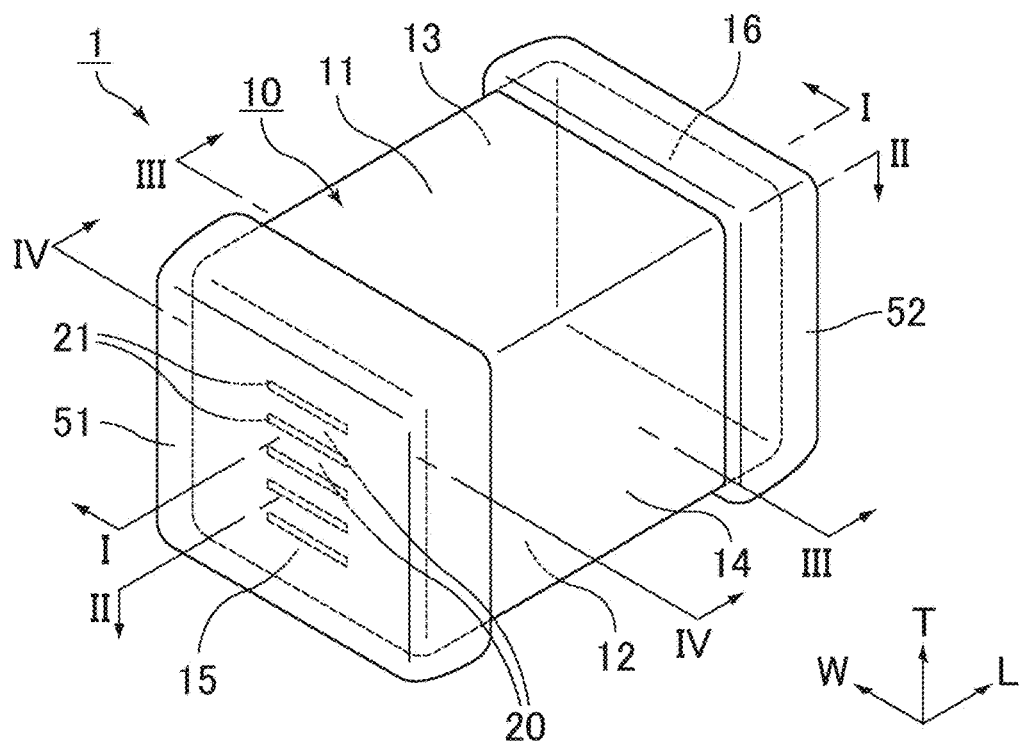
FIG. 1 is a perspective view showing an example of a multilayer ceramic capacitor according to a preferred embodiment of the present invention.

In the present specification, the stacking direction, the length direction, and the width direction of the multilayer ceramic capacitor and the stacked body are defined as directions indicated by T, L, and W, respectively, in FIG. 1. Here, the stacking direction (T direction), the length direction (L direction), and the width direction (W direction) are orthogonal or substantially orthogonal to one another. The stacking direction (T direction) is a direction in which the plurality of dielectric layers and the plurality of internal electrode layers are stacked.

FIG. 1 is a perspective view showing an example of the multilayer ceramic capacitor according to a preferred embodiment of the present invention.

As shown in FIG. 1, a multilayer ceramic capacitor 1 includes a stacked body 10, and a first external electrode 51 and a second external electrode 52 provided on the surfaces of stacked body 10.

Stacked body 10 includes a first main surface 11 and a second main surface 12 opposite to each other in the stacking direction (T direction), a first side surface 13 and a second side surface 14 opposite to each other in the width direction (W direction) orthogonal or substantially orthogonal to the stacking direction (T direction), and a first end surface 15 and a second end surface 16 opposite to each other in the length direction (L direction) orthogonal or substantially orthogonal to the stacking direction (T direction) and the width direction (W direction).

In the present specification, a cross section of multilayer ceramic capacitor 1 or stacked body 10 that is orthogonal or substantially orthogonal to first end surface 15 and second end surface 16 and is parallel or substantially parallel to the stacking direction (T direction) is referred to as an LT cross section. Further, a cross section of multilayer ceramic capacitor 1 or stacked body 10 that is orthogonal or substantially orthogonal to first side surface 13 and second side surface 14 and is parallel or substantially parallel to the stacking direction (T direction) is referred to as a WT cross section. Further, a cross section of multilayer ceramic capacitor 1 or stacked body 10 that is orthogonal or substantially orthogonal to first end surface 15, second end surface 16, first side surface 13, and second side surface 14 and is orthogonal or substantially orthogonal to the stacking direction (T direction) is referred to as an LW cross section.

Preferably, for example, corner portions and ridge portions of stacked body 10 are rounded. A corner portion is a portion where three surfaces of the stacked body meet, and a ridge portion is a portion where two surfaces of the stacked body meet.

In multilayer ceramic capacitor 1 shown in FIG. 1, the dimension of stacked body 10 in the length direction (L direction) is longer than the dimension thereof in the width direction (W direction). However, the dimension of stacked body 10 in the length direction may be shorter than the dimension thereof in the width direction, or may be substantially the same as the dimension thereof in the width direction.

First external electrode 51 is located on first end surface 15 of stacked body 10. Preferably, for example, first external electrode 51 extends from first end surface 15 of stacked body 10 and covers portions of first main surface 11, second main surface 12, first side surface 13, and second side surface 14.

Second external electrode 52 is located on second end surface 16 of stacked body 10. Preferably, for example, second external electrode 52 extends from second end surface 16 of stacked body 10 and covers portions of first main surface 11, second main surface 12, first side surface 13, and second side surface 14.

Figure 2:
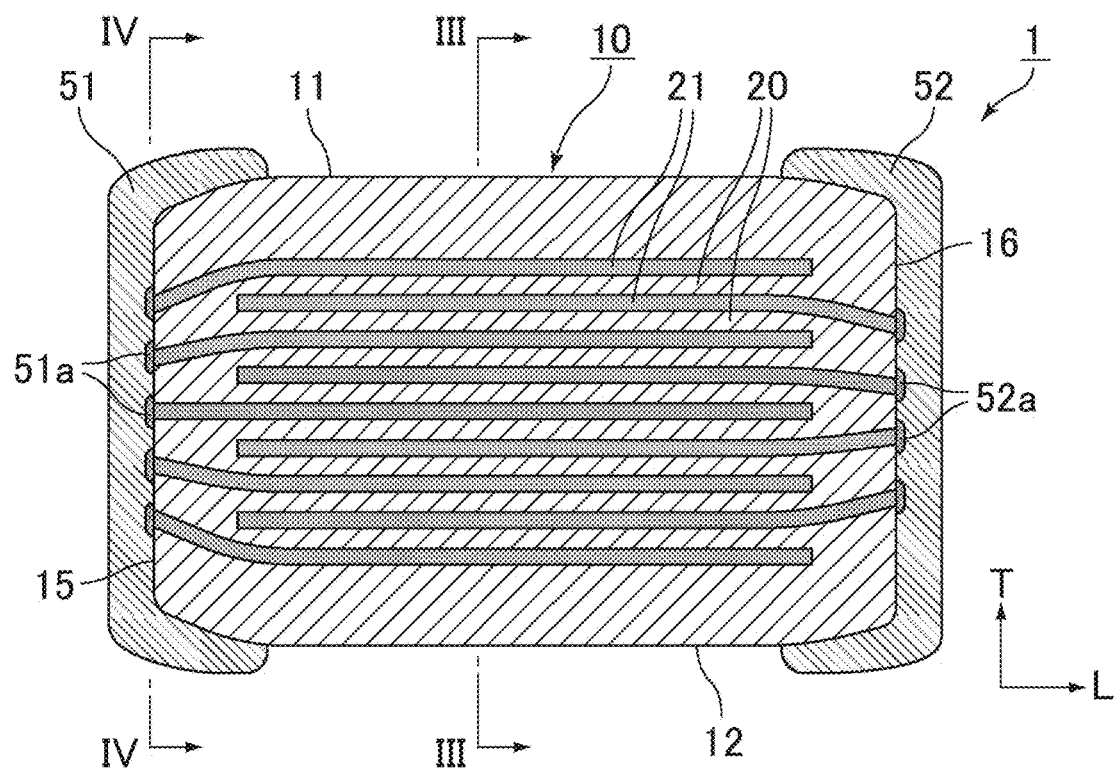
FIG. 2 is a cross sectional view of the multilayer ceramic capacitor shown in FIG. 1, taken along a line I-I.

FIG. 2 is a cross sectional view of the multilayer ceramic capacitor shown in FIG. 1, taken along a line I-I.

Stacked body 10 includes a plurality of dielectric layers 20 and a plurality of internal electrode layers 21 stacked alternately.

As shown in FIG. 2, adjacent to or in a vicinity of first end surface 15 and second end surface 16 of stacked body 10, internal electrode layers 21 are deformed toward the center in the stacking direction.

The deformation described above originates from a manufacturing process for the multilayer ceramic capacitor of fabricating the stacked body with ceramic green sheets each including an electrode pattern, which is to define and function as an internal electrode layer, applied on a surface thereof.

It is estimated that the following behavior occurs in the dielectric layers at portions in which the internal electrodes are led out. When a plurality of ceramic green sheets each including an electrode pattern, which is to define and function as an internal electrode layer, printed thereon are stacked, a portion in which the electrode pattern is formed is thick, and a portion in which the electrode pattern is not formed is thin. With respect to the portions in which the internal electrode layers are led out, since the internal electrode layers are alternately led out to the opposite end surfaces, the thickness of the portions is thinner than the thickness of a region in which the internal electrode layers are formed, which is to define and function as an effective portion.

It is estimated that, when a stacked body is pressure-molded, a force from a direction other than the stacking direction is applied to the portions in which the internal electrode layers are led out, which are regions in which the ceramic green sheets have a thin thickness, and thereby the dielectric layers are displaced and the insulation resistance between the internal electrodes is reduced. In particular, when the dielectric layers have a thin thickness, it becomes impossible to disregard the degree of reduction in insulation resistance.

Dielectric layers 20 sandwiched between internal electrode layers 21 have an average thickness of less than or equal to about 0.5 μm.

Preferably, for example, dielectric layers 20 sandwiched between internal electrode layers 21 have an average thickness of more than or equal to about 0.1 μm and less than or equal to about 0.5 μm.

Dielectric layers 20 are made of a dielectric material. As the dielectric material, a dielectric ceramic including a main component such as barium titanate, calcium titanate, strontium titanate, barium calcium titanate, or calcium zirconate may preferably be used, for example. When the above dielectric material is included as a main component, a sub component having a content smaller than a content of the main component, such as, for example, an Mg compound, an Mn compound, an Si compound, an Al compound, a V compound, or an Ni compound, for example, may be added, depending on the desired characteristics of multilayer ceramic capacitor 1.

The dielectric material before firing defining the ceramic green sheets, which are to define and function as dielectric layers 20, preferably, for example, has an average particle diameter of less than or equal to about 150 nm. To thin the dielectric layers, the ceramic green sheets preferably have, for example, an average thickness that is less than or equal to about 4.7 times the average particle diameter of the dielectric material before firing.

Further, dielectric grains defining dielectric layers 20 after firing have grain diameters within a range from about 100 nm to about 400 nm, due to grain growth. Preferably, for example, the dielectric grains have an average grain diameter within a range from about 150 nm to about 300 nm. To reduce the height of the multilayer ceramic capacitor, dielectric layers 20 after firing preferably have, for example, an average thickness of less than or equal to about 0.5 μm, and the average thickness of dielectric layers 20 is less than or equal to about 3.4 times the average grain diameter of the dielectric grains. Preferably, for example, the average thickness of dielectric layers 20 is more than or equal to about 1.3 times the average grain diameter of the dielectric grains, in order to provide a sufficient electric insulation between internal electrode layers 21 by dielectric layers 20.

It should be noted that the average thickness of each of the plurality of internal electrode layers and the plurality of dielectric layers is determined by observing, with a SEM, a cross section orthogonal or substantially orthogonal to the length direction of the stacked body that is exposed by polishing, drawing a center line along the stacking direction that passes through the center of the cross section of the stacked body and two lines spaced away from the center line at regular intervals on each of both sides, measuring thicknesses on these five lines, and calculating an average value of these five measured values.

Further, the average grain diameter of the dielectric grains may be measured by analyzing a cross sectional image scanned with a SEM. For example, the average grain diameter of the dielectric grains may be measured by software to measure an average grain diameter in conformity with the standard of JIS G 0511.

Internal electrode layers 21 may be provided by a conductive component. Internal electrode layers 21 preferably include a metal such as Ni, Cu, Ag, Pd, or Au, for example, or an alloy including one of these metals, such as an Ag—Pd alloy, for example. Internal electrode layers 21 may further include dielectric particles based on a composition identical or similar to the composition of the dielectric material included in dielectric layers 20.

The total number of stacked internal electrode layers 21 is preferably more than or equal to 5 and less than or equal to 2000, for example, and more preferably more than or equal to 40 and less than or equal to 400, for example.

Internal electrode layers 21 preferably have an average thickness of more than or equal to about 0.3 μm and less than or equal to about 30 μm, for example.

Densified portions 51a, which are portions having a relatively high ratio of a conductive component defining first external electrode 51 and a relatively low void ratio, are preferably continuously provided on surfaces of internal electrode layers 21 exposed at first end surface 15, for example.

Further, densified portions 52a, which are portions having a relatively high ratio of a conductive component defining second external electrode 52 and a relatively low void ratio, are preferably continuously provided on surfaces of internal electrode layers 21 exposed at second end surface 16, for example.

When densified portions 51a and densified portions 52a are respectively provided on the surfaces of internal electrode layers 21 exposed at first end surface 15 and the surfaces of internal electrode layers 21 exposed at second end surface 16, contact property between internal electrode layers 21 and first external electrode 51 or second external electrode 52 is able be significantly improved.

The ratios of the conductive component in densified portions 51a of first external electrode 51 and densified portions 52a of second external electrode 52 are preferably higher than ratios of the conductive component in portions other than the densified portions of first external electrode 51 and second external electrode 52, for example. Further, the void ratios in densified portions 51a of first external electrode 51 and densified portions 52a of second external electrode 52 are preferably lower than void ratios in the portions other than the densified portions of first external electrode 51 and second external electrode 52, for example.

The ratios of the conductive component of first external electrode 51 and second external electrode 52 may be measured by SEM-EDX.

Specifically, each of cut surfaces of first external electrode 51 and second external electrode 52 provided when the multilayer ceramic capacitor is cut in an LT direction is measured by SEM-EDX to provide an element mapping image, and the ratio of the area of the conductive component to an area of about 100 nm×about 100 nm in the element mapping image is defined as a ratio of the conductive component. Then, each external electrode is divided into three regions in the length direction, the ratio of the conductive component is measured at three locations in each region, and an average value of the ratios of the conductive component is defined as the ratio of the conductive component of each external electrode.

On the other hand, the ratio of the conductive component in the densified portions is defined as an average value of ratios of the conductive component measured at five regions of about 100 nm×about 100 nm in the surfaces of internal electrode layers 21 exposed at first end surface 15 or second end surface 16 of stacked body 10.

The void ratios of first external electrode 51 and second external electrode 52 may be measured with a SEM.

Specifically, each of the cut surfaces of first external electrode 51 and second external electrode 52 provided when the multilayer ceramic capacitor is cut in the LT direction is observed with a SEM to provide an enlarged image, and the ratio of the area of voids to an area of about 100 nm×about 100 nm in the enlarged image is defined as the void ratio.

On the other hand, the void ratio in the densified portions is defined as an average value of void ratios measured at five regions of about 100 nm×about 100 nm in the surfaces of internal electrode layers 21 exposed at first end surface 15 or second end surface 16 of stacked body 10.

In the multilayer ceramic capacitor, the internal electrode layer includes a first region in which continuity of the conductive component defining the internal electrode layer is relatively high, and a second region in which continuity of the conductive component is relatively low.

The level of continuity of the conductive component defining the internal electrode layer is compared based on a line coverage measured by the following method.

First, the LT cross section of the stacked body is polished to expose the internal electrode layers. Accordingly, internal electrode sagging is eliminated by polishing. Then, a region defining and functioning as an effective portion of the internal electrode layers in the stacked body is equally or substantially equally divided into five regions in the length direction of the stacked body, to define a region closest to one end surface of the stacked body (region La), a central region (region Lc), and a region sandwiched therebetween (region Lb). Thereafter, for every internal electrode layer in each region, the area of the internal electrode layer in a case where it is assumed that the internal electrode layer is a sheet having a uniform thickness is compared with the area of the conductive component defining an actual internal electrode layer, and the ratio of the area of the conductive component defining the actual internal electrode layer to the area of the internal electrode layer in the case where it is assumed that the internal electrode layer is a sheet having a uniform thickness is calculated as a line coverage. An average value of the calculated line coverages of all of the internal electrode layers is defined as an average value of the line coverages in each region.

Although the magnification of the SEM only has to be more than or equal to about 1000 times and less than or equal to about 5000 times, it is preferably about 2000 times, for example. It should be noted that measurement conditions, for example, acceleration voltage and magnification, are fixed in all of the regions.

It should be noted that the cross section of the stacked body exposed when measuring the line coverage may be the WT cross section. Accordingly, a region defining and functioning as an effective portion of the internal electrode layers is equally or substantially equally divided into five regions in the width direction of the stacked body, to define a region closest to one side surface of the stacked body as a region Wa, a central region as a region Wc, and a region sandwiched therebetween as a region Wb, and an average value of line coverages in each region is calculated.

A method for measuring the line coverage will be described with reference to FIGS. 3 and 4.

Figure 3:
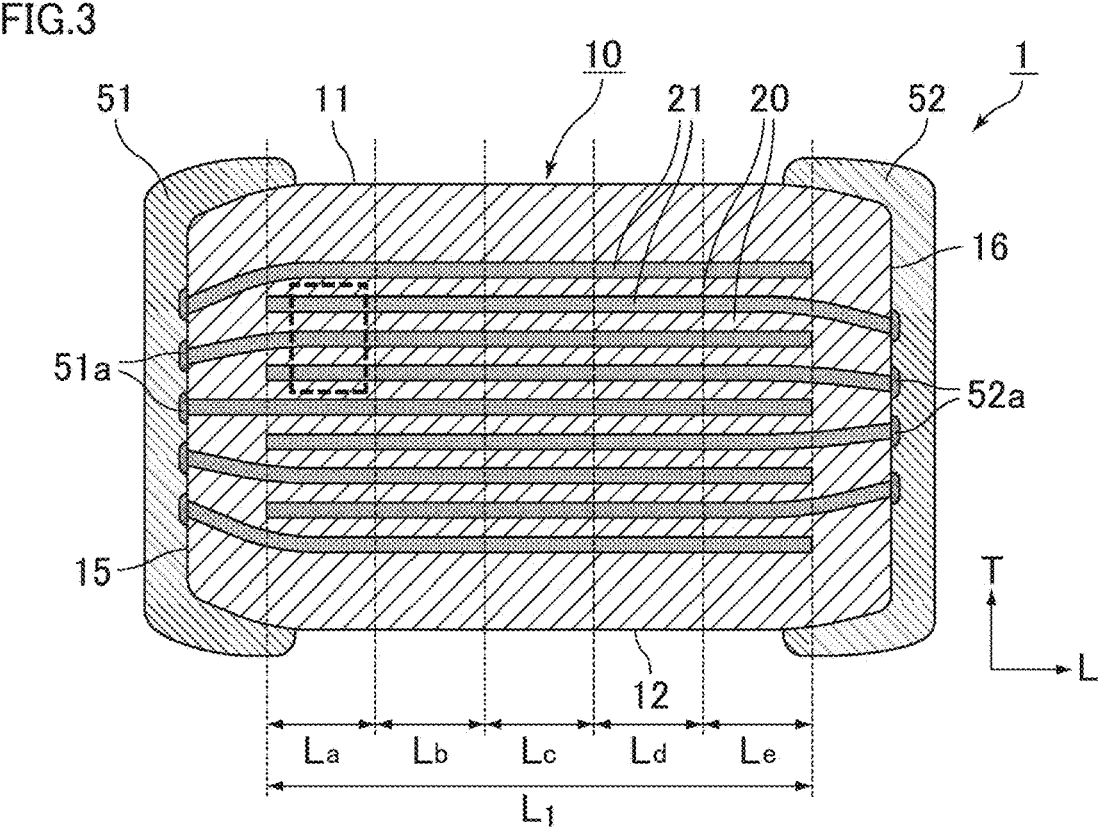
FIG. 3 is a view showing a method for measuring a line coverage in an LT cross section.

FIG. 3 is a view showing a method for measuring the line coverage in the LT cross section, including auxiliary lines added to the cross sectional view of the multilayer ceramic capacitor shown in FIG. 2.

A region defining and functioning as an effective portion in multilayer ceramic capacitor 1 shown in FIG. 3 is a region in which internal electrode layers 21 exposed at first end surface 15 face internal electrode layers 21 exposed at second end surface 16 (a region indicated by a double-headed arrow Li in FIG. 3). Of regions (La, Lb, Lc, Ld, Le) provided by equally or substantially equally dividing region Li defining and functioning as the effective portion into five regions in the length direction of stacked body 10, region La closest to first end surface 15, central region Lc, and region Lb sandwiched therebetween are defined.

Figure 4:
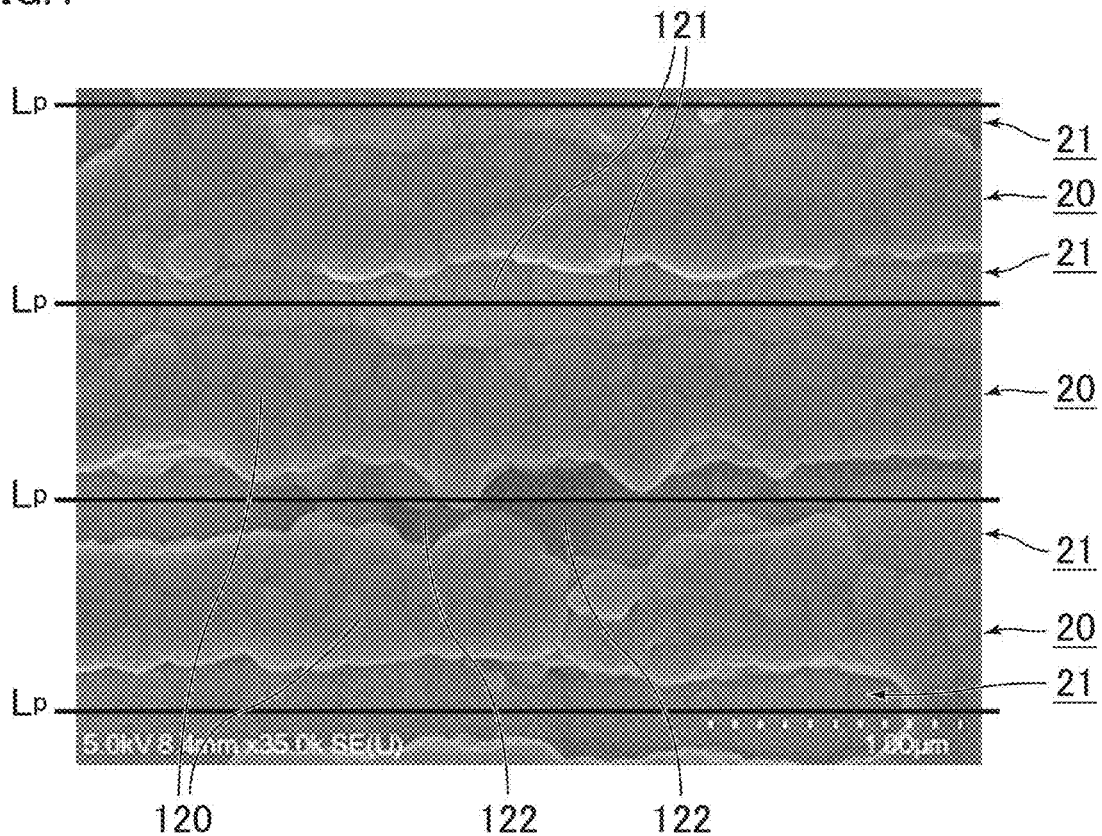
FIG. 4 is a SEM image in which a region indicated by a broken line in FIG. 3 is enlarged in an actual multilayer ceramic capacitor.

A SEM image in which region La shown in FIG. 3 is observed in an actual multilayer ceramic capacitor is shown in FIG. 4. FIG. 4 is a SEM image in which a region indicated by a broken line in FIG. 3 is enlarged in the actual multilayer ceramic capacitor.

As shown in FIG. 4, in region La, internal electrode layers 21 and dielectric layers 20 are stacked alternately.

Each dielectric layer 20 is defined by dielectrics grains 120.

Each internal electrode layer 21 includes a region in which a conductive component 121 exists and a region 122 in which conductive component 121 does not exist.

In the SEM image shown in FIG. 4, the ratio of the length of the region occupied by conductive component 121 actually defining internal electrode layer 21 (that is, the length except for the region in which conductive component 121 does not exist) to the length of imaginary lines Lp having the same or substantially the same length as the length of region La represents a line coverage.

Measurement of the line coverage is performed in all of the internal electrode layers in each region to calculate an average value.

By measuring the line coverage with the above method in a plurality of LT cross sections provided by changing a cutting position in the width direction of the stacked body, distribution of the line coverages in an internal electrode main body portion defining the internal electrode layer is able to be provided.

A region in which an average value of the line coverages calculated by the above method is more than or substantially equal to a predetermined threshold value is a first region, and a region in which the average value of the line coverages is less than the predetermined threshold value is a second region.

The predetermined threshold value for the line coverage is set to about 90% of the value of the line coverage in region Lc in an LT cross section provided by cutting the stacked body at the center or substantially the center in the width direction.

By performing the measurement of the line coverage described above a plurality of times while changing the cutting position in the width direction of the stacked body, distribution in an LW plane of the first region and the second region in the internal electrode layer is able to be confirmed.

Region Lc in the LT cross section provided by cutting the stacked body at the center or substantially the center in the width direction corresponds to a substantially central portion of the internal electrode main body portion. On the other hand, any of region La, region Lb, and region Lc in an LT cross section provided by cutting the stacked body with a portion close to an end portion of each internal electrode layer closer to one side surface is exposed corresponds to a peripheral edge portion (a portion that is not the substantially central portion) of the internal electrode main body portion.

Therefore, for example, by confirming that the value of the line coverage in region Lc in the LT cross section provided by cutting the stacked body at the center or substantially the center in the width direction is higher than the values of the line coverage in region La, region Lb, and region Lc in the LT cross section provided by cutting the stacked body with the portion close to the end portion of each internal electrode layer closer to one side surface is exposed, the substantially central portion of the internal electrode main body portion is able to be confirmed as being defined by the first region.

Figure 5:
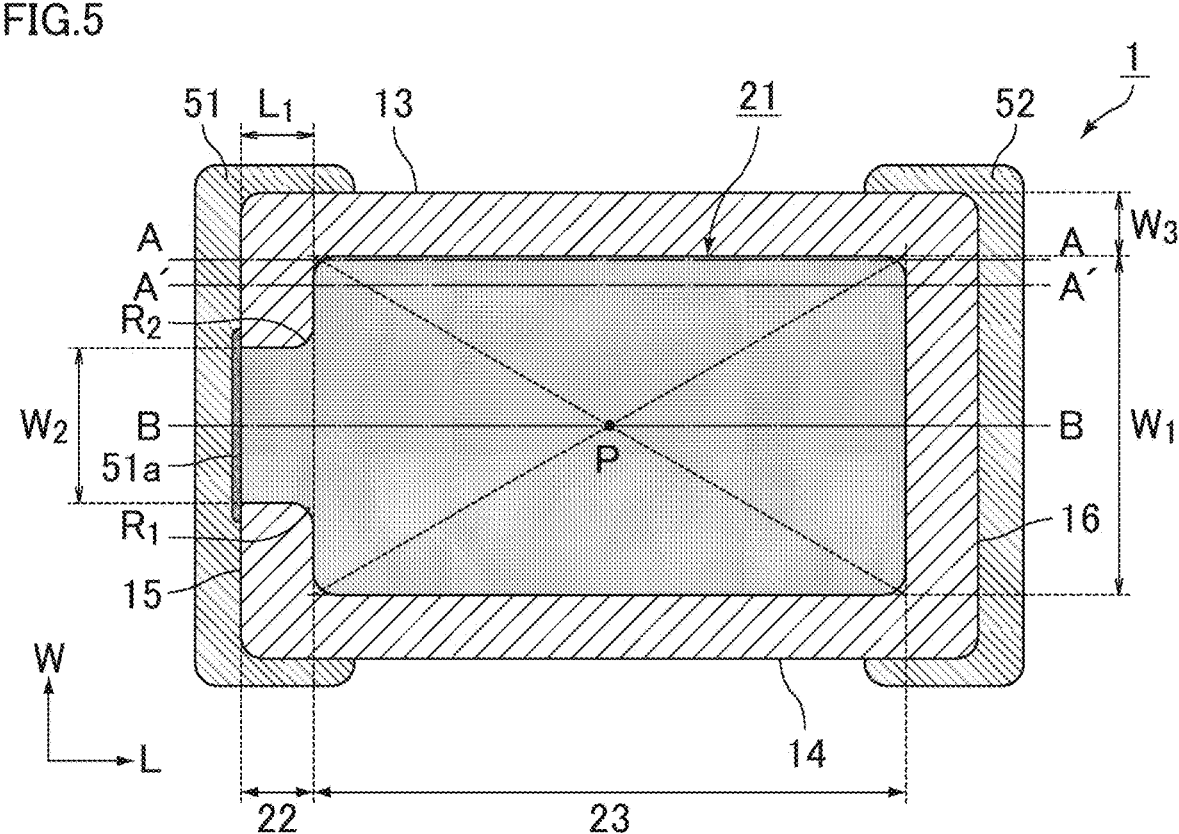
FIG. 5 is a cross sectional view of the multilayer ceramic capacitor shown in FIG. 1, taken along a line II-II.

FIG. 5 is a cross sectional view of the multilayer ceramic capacitor shown in FIG. 1, taken along a line II-II.

When internal electrode layers 21 are viewed from the stacking direction (T direction) of stacked body 10, internal electrode layers 21 each include an internal electrode main body portion 23 having a rectangular or substantially rectangular shape that defines and functions as an effective region, and an internal electrode lead-out portion 22 that leads out internal electrode main body portion 23 to first end surface 15 or second end surface 16.

In FIG. 5, internal electrode layer 21 is led out to first end surface 15 of stacked body 10.

It should be noted that the internal electrode main body portion and the internal electrode lead-out portion do not correspond to the first region and the second region, respectively. Therefore, the internal electrode main body portion may be defined by the first region and the second region, or the internal electrode lead-out portion may be defined by the first region and the second region.

The substantially central portion of internal electrode main body portion 23 is defined by the first region.

When the substantially central portion of internal electrode main body portion 23 is defined by the first region, a sufficient capacitance is able to be generated between internal electrode main body portions facing each other with dielectric layer 20 provided between the internal electrode main body portions.

The center of the internal electrode main body portion refers to an intersection P of diagonal lines in a case where the internal electrode main body portion is considered to have a rectangular or substantially rectangular shape, and the substantially central portion of the internal electrode main body portion refers to a region including the center of the internal electrode main body portion.

At least a portion of internal electrode lead-out portion 22 is defined by the second region.

When at least a portion of internal electrode lead-out portion 22 is defined by the second region, an insulation failure caused by contact between internal electrode layers 21 is able to be significantly reduced or prevented, even when the average thickness of the dielectric layers is less than or equal to about 0.5 µm.

On the other hand, when at least a portion of internal electrode lead-out portion 22 is defined by the second region, contact property between internal electrode layers 21 and first external electrode 51 or second external electrode 52 is deteriorated. When densified portions 51a and densified portions 52a are continuously provided at portions of first external electrode 51 and second external electrode 52 in contact with internal electrode layers 21, the contact property between internal electrode layers 21 and first external electrode 51 and the contact property between internal electrode layers 21 and second external electrode 52 is able to be significantly improved.

Furthermore, since the internal electrode layers are alternately led out to first end surface 15 and second end surface 16, a level difference is likely to be produced during stacking in internal electrode lead-out portion 22, and the level difference may deteriorate close contact property between internal electrode layers 21 and dielectric layers 20. In contrast, when at least a portion of internal electrode lead-out portion 22 is defined by the second region, close contact property between internal electrode lead-out portion 22 and dielectric layers 20 is able to be significantly improved.

In the first region, continuity of the conductive component defining the internal electrode layer is relatively high, that is, the line coverage is high. Thus, the first region has a relatively high conductivity.

In the second region, continuity of the conductive component defining the internal electrode layer is relatively low, that is, the line coverage is low. Thus, the second region has a relatively low conductivity.

A value $C_1$ of the line coverage in the first region is preferably more than or equal to about 80% and less than or equal to about 98%, for example.

A value $C_2$ of the line coverage in the second region is preferably more than or equal to about 55% and less than about 80%, for example.

The ratio of value $C_2$ of the line coverage in the second region to value $C_1$ of the line coverage in the first region $[C_2/C_1]$ is preferably less than or equal to about 0.89, for example.

The ratio of the area that internal electrode layer 21 covers dielectric layer 20 when internal electrode layer 21 and dielectric layer 20 are viewed in plan view from the stacking direction is preferably more than or equal to about 55%, more preferably more than or equal to about 85%, and further preferably more than or equal to about 90%, for example.

In the second region, there may be a portion in which the conductive component defining internal electrode layer 21 does not exist when internal electrode layer 21 is viewed in top view from the stacking direction.

Accordingly, dielectric layers 20 facing each other are directly joined, which significantly improves adhesive strength between dielectric layers 20 and significantly reduces or prevents interlayer peeling.

In multilayer ceramic capacitor 1, a length $W_2$ of internal electrode lead-out portion 22 in the width direction (W direction) of stacked body 10 is preferably less than or equal to about ½ of a length $W_1$ of internal electrode main body portion 23, for example. When length $W_2$ of internal electrode lead-out portion 22 in the width direction is less than or equal to about ½ of length $W_1$ of internal electrode main body portion 23, internal electrode layer 21 exposed at the end surface of stacked body 10 has a smaller area, which is able to significantly reduce or prevent deterioration of multilayer ceramic capacitor 1 due to moisture intrusion into stacked body 10 and the like.

Preferably, for example, length $W_2$ of the internal electrode lead-out portion in the width direction of the stacked body is more than or equal to about ⅓ and less than or equal to about ½ of length $W_1$ of internal electrode main body portion 23.

As shown in FIG. 5, a predetermined distance $W_3$ (hereinafter also referred to as a "W gap") is provided from first side surface 13 or second side surface 14 of stacked body 10 to internal electrode main body portion 23.

In addition, a predetermined distance Li (hereinafter also referred to as a "L gap") is provided from first end surface or second end surface 16 of stacked body 10 to internal electrode main body portion 23.

In the multilayer ceramic capacitor, the W gap is preferably less than or equal to about 15 μm, for example, and more preferably more than or equal to about 6 μm and less than or equal to about 15 μm, for example.

In the multilayer ceramic capacitor, the L gap is preferably less than or equal to about 25 μm, for example, and more preferably more than or equal to about 12 μm and less than or equal to about 25 μm, for example.

In the multilayer ceramic capacitor, a thickness of the internal electrode layer in the second region is preferably smaller than a thickness of the internal electrode layer in the first region, for example.

The outer periphery of the internal electrode main body portion when the internal electrode layer is viewed in plan view is a portion in which the internal electrode layers are likely to be brought into contact with each other by pressure molding. Therefore, when the thickness of the internal electrode layer in the second region is smaller than the thickness of the internal electrode layer in the first region, contact between the internal electrode layers is less likely to occur in outer peripheral portions of the internal electrode layers, which is able to significantly reduce or prevent dielectric breakdown.

The thickness of the internal electrode layer in the second region may be identical or different for each internal electrode layer.

Preferably, for example, the thickest portion and the thinnest portion of the internal electrode layer including the internal electrode lead-out portion at the first end surface are different from the thickest portion and the thinnest portion of the internal electrode layer having the internal electrode lead-out portion at the second end surface.

When the thickest portion and the thinnest portion of the internal electrode layer having the internal electrode lead-out portion at the first end surface are different from the thickest portion and the thinnest portion of the internal electrode layer including the internal electrode lead-out portion at the second end surface, a portion in which the stacked body is extremely thick and a portion in which the stacked body is extremely thin are less likely to be produced.

Preferably, for example, corner portions of a connection portion between internal electrode main body portion 23 and internal electrode lead-out portion 22 defining internal electrode layer 21 are provided with roundness.

Providing roundness to the corner portions of the connection portion between internal electrode main body portion 23 and internal electrode lead-out portion 22 is able to avoid stress concentration and is able to significantly reduce or prevent occurrence of a crack at the corner portions of the stacked body.

In internal electrode layer 21 shown in FIG. 5, corner portions $R_1$ and $R_2$ of the connection portion between internal electrode main body portion 23 and internal electrode lead-out portion 22 are provided with roundness.

The multilayer ceramic capacitor preferably has, for example, the following external dimensions: a length dimension (L dimension) of less than or equal to about 275 μm; a width dimension (W dimension) of less than or equal to about 143 μm; and a height dimension (T dimension) of less than or equal to about 143 μm. It should be noted that the external dimensions of the multilayer ceramic capacitor include not only dimensions of the stacked body but also dimensions of the first external electrode and the second external electrode. In an Example described later, the external dimensions of the multilayer ceramic capacitor were set in the following ranges: a length dimension (L dimension) of more than or equal to about 225 μm and less than or equal to about 275 μm; a width dimension (W dimension) of more than or equal to about 117 μm and less than or equal to about 143 μm; and a height dimension (T dimension) of more than or equal to about 117 μm and less than or equal to about 143 μm.

In the multilayer ceramic capacitor, when the internal electrode layer is viewed in plan view, the plan view shape of the internal electrode main body portion defining and functioning as the effective region is preferably a spool shape having a wide width at both end portions and a narrow width at a substantially central portion in the length direction, for example.

The plan view shape of the internal electrode main body portion may be the spool shape described above by deforming an electrode paste provided on green sheets by pressurization during fabrication of the stacked body. When the plan view shape of the internal electrode main body portion is the spool shape described above, the internal electrode main body portion has an increased area, which is able to significantly improve the capacitance as the multilayer ceramic capacitor.

The spool shape described above is a shape in which four corners of a rectangular or substantially rectangular shape extend (spread) outward. Therefore, when the maximum rectangular shape that is able to be accommodated within the internal electrode main body portion is assumed in the plan view shape of the internal electrode main body portion, portions of the internal electrode main body portion that protrude out of the rectangular shape (hereinafter also referred to as "spreading portions") are preferably defined by the second region, for example. In addition, more preferably, for example, the thickness of the internal electrode main body portion at the spreading portions is smaller than the thickness of the internal electrode main body portion inside the substantially rectangular shape.

The spreading portions described above are portions in which the internal electrode layer provided on a ceramic green sheet has a thin thickness. Therefore, when the plan view shape of the internal electrode main body portion is the spool shape described above, the spreading portions described above define and function as anchors to determine the position of the internal electrode main body portion during stacking of the ceramic green sheet, and are able to significantly reduce or prevent misalignment during stacking.

In the multilayer ceramic capacitor, the internal electrode main body portion preferably has, for example, a shape having a bent portion in a cross section of the stacked body in a direction perpendicular or substantially perpendicular to the length direction. Examples of the shape having a bent portion include a V shape, an M shape, and the like, and an M shape.

When the shape of the internal electrode main body portion is the shape having a bent portion, close contact property between the internal electrode layer and the dielectric layer is significantly improved by an anchor effect.

Figure 6:
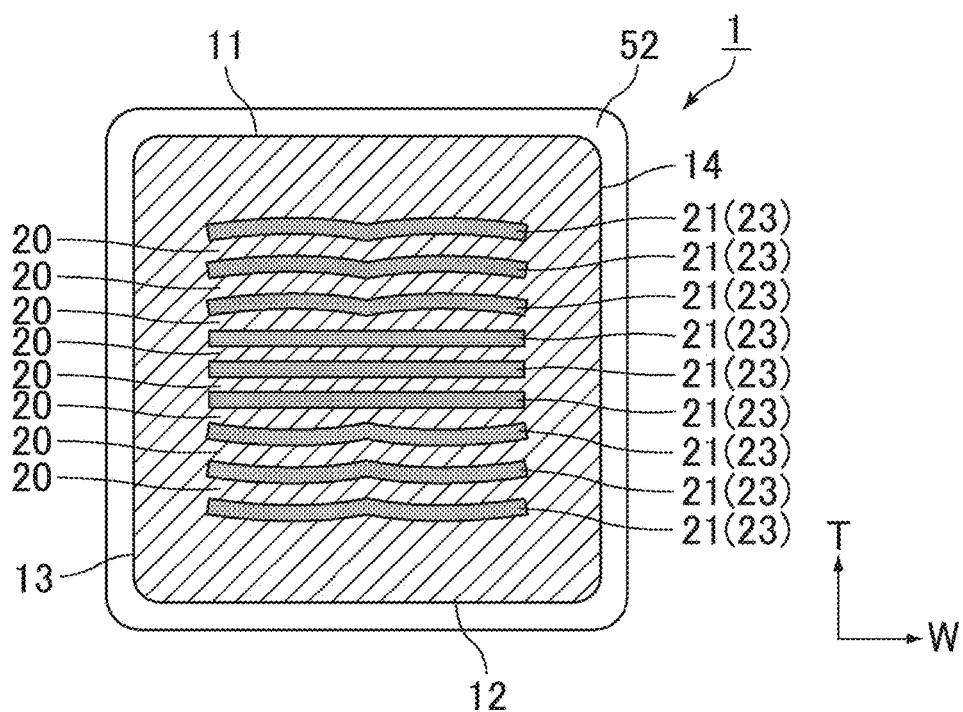
FIG. 6 is a cross sectional view of the multilayer ceramic capacitor shown in FIG. 1, taken along a line III-III.

FIG. 6 is a cross sectional view of the multilayer ceramic capacitor shown in FIG. 1, taken along a line III-III.

As shown in FIG. 6, internal electrode main body portions 23 located at positions close to first main surface 11 and second main surface 12 in the cross section of stacked body 10 in the direction perpendicular or substantially perpendicular to the length direction of stacked body 10 preferably have, for example, an M shape including a bent portion (dent) at a substantially central portion.

The bent portion protrudes toward the center of stacked body 10 in the stacking direction.

Internal electrode main body portions 23 located at the center or substantially the center in the stacking direction do not include a bent portion.

In addition, when the cross sectional shape of the internal electrode main body portion is the shape including a bent portion as described above, good posture stability during mounting of the multilayer ceramic capacitor is provided, when compared with a multilayer ceramic capacitor in which an internal electrode main body portion has a cross sectional shape not having a bent portion.

In the multilayer ceramic capacitor, the internal electrode lead-out portion preferably has, for example, a shape including a bent portion in a cross section of the stacked body in the direction perpendicular or substantially perpendicular to the length direction. Examples of the shape including a bent portion include a V shape.

When the shape of the internal electrode lead-out portion is the shape including a bent portion, close contact property between the internal electrode layer and the dielectric layer is significantly improved by an anchor effect.

Figure 7:
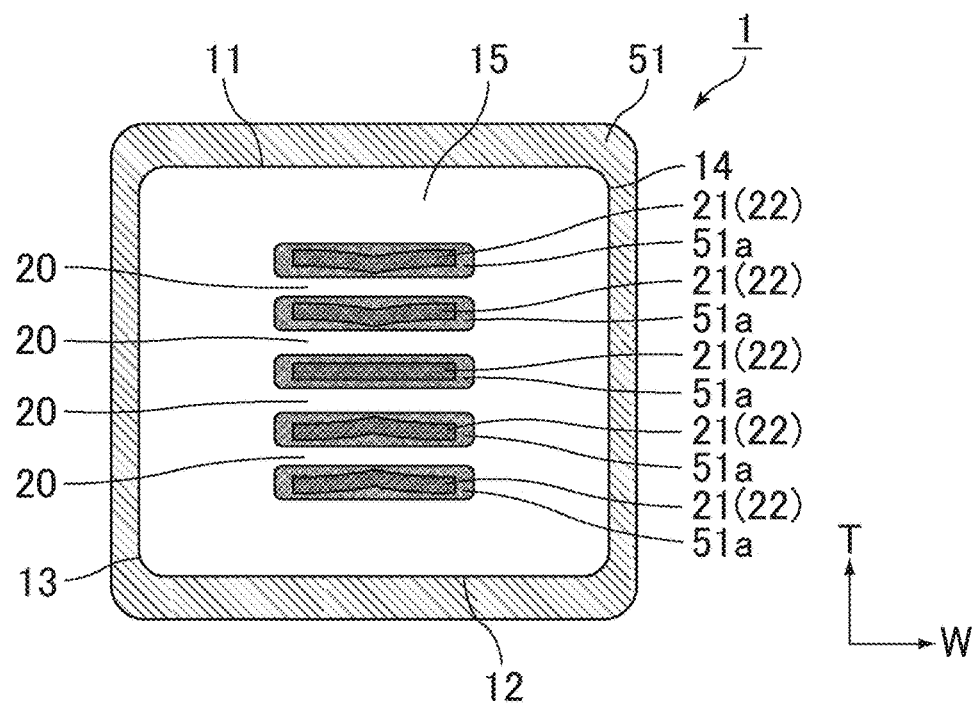
FIG. 7 is a cross sectional view of the multilayer ceramic capacitor shown in FIG. 1, taken along a line IV-IV.

FIG. 7 is a cross sectional view of the multilayer ceramic capacitor shown in FIG. 1, taken along a line IV-IV.

As shown in FIG. 7, internal electrode lead-out portions 22 defining internal electrode layers 21 located at positions close to first main surface 11 and second main surface 12 in the WT cross section of stacked body 10 preferably have a V shape including a bent portion (dent) at a substantially central portion, for example.

The bent portion protrudes toward the center of stacked body 10 in the stacking direction.

Internal electrode lead-out portion 22 located at the center or substantially the center in the stacking direction does not include a bent portion. When the cross sectional shape of the internal electrode lead-out portion in the WT cross section is the shape including a bent portion, close contact property between the internal electrode layer and the dielectric layer is significantly improved by an anchor effect.

Densified portions 51a of first external electrode 51 continuously cover surfaces of internal electrode lead-out portions 22 exposed at first end surface 15. Although not shown in FIG. 7, densified portions 52a of second external electrode 52 are also continuously formed on surfaces of internal electrode lead-out portions 22 exposed at second end surface 16.

In addition, although not shown in FIG. 7, the shape of the surfaces of internal electrode lead-out portions 22 exposed at second end surface 16 is preferably a V shape including a bent portion, for example.

The multilayer ceramic capacitor may be manufactured, for example, by the following method.

First, a ceramic green sheet for forming dielectric layer 20 is prepared.

In addition, an internal electrode conductive paste for forming internal electrode layers 21, and an external electrode conductive paste for forming first external electrode 51 and second external electrode 52 are prepared.

It should be noted that the ceramic green sheet, the internal electrode conductive paste, and the external electrode conductive paste include an organic binder and an organic solvent, and known organic binder and organic solvent may be used.

The internal electrode conductive paste with a predetermined pattern, for example, is applied on the ceramic green sheet, to form an internal electrode pattern. Accordingly, the internal electrode pattern preferably has, for example, a shape including a rectangular or substantially rectangular region to define and function as an internal electrode main body portion, and rectangular or substantially rectangular region to define and function as an internal electrode lead-out portion to electrically connect the internal electrode main body portion to the external electrode.

Further, a length of the rectangular or substantially rectangular region to define and function as the internal electrode lead-out portion in the width direction is preferably less than or equal to about ½ of a length of the substantially rectangular region to define and function as the internal electrode main body portion in the width direction, for example.

The internal electrode conductive paste is preferably applied, for example, to provide a conductive component that has a relatively high concentration in a region to define and function as a substantially central portion of the internal electrode main body portion, and that has a relatively low concentration in a region to define and function as an outer peripheral portion of the internal electrode main body portion, rather than uniformly applying the internal electrode conductive paste on the ceramic green sheet.

In the region in which the conductive component has a relatively high concentration, the conductive components are likely to be continuously sintered during sintering. Thus, the above region is to define and function as the first region having a high line coverage. In the region in which the conductive component has a relatively low concentration, the conductive components are less likely to be continuously sintered during sintering. Thus, the above region is to define and function as the second region having a low line coverage.

For example, a method may be used to intensively apply the internal electrode conductive paste to the region to define and function as the substantially central portion of the internal electrode main body portion on the ceramic green sheet, and spread the internal electrode conductive paste to the outer peripheral portion utilizing flowability of the internal electrode conductive paste and pressurization after stacking.

By using the method described above, a region in which continuity of the conductive component is high and a region in which continuity of the conductive component is low are formed in the internal electrode layer, and the internal electrode layer having the first region and the second region is able to be provided.

As a method of providing the internal electrode layer having the above components and elements, for example, a method of displacing the position of a paste charging port from a position that would allow the internal electrode conductive paste to be uniformly charged over the internal electrode main body portion, toward the substantially central portion, may be provided. By displacing the paste charging port toward the substantially central portion, the internal electrode conductive paste is less likely to be supplied uniformly to the outer peripheral portion that is far from the substantially central portion. Preferably, for example, by firing the internal electrode conductive paste in this state, the internal electrode layer in which continuity of the conductive component is high (the first region) is formed at the substantially central portion of the internal electrode main body portion adjacent to or in a vicinity of the charging port, and the internal electrode layer in which continuity of the conductive component is low (the second region) is formed at the outer peripheral portion of the internal electrode main body portion.

Then, a ceramic paste is applied on the ceramic green sheet around the internal electrode pattern without overlapping a peripheral edge portion of the internal electrode pattern, to form a ceramic paste layer to reduce a level difference due to the thickness of the internal electrode pattern.

It should be noted that the order of the step of forming the internal electrode pattern and the step of forming the ceramic paste layer is not particularly limited, and the internal electrode pattern may be formed after the ceramic paste layer is formed.

Subsequently, a predetermined number of ceramic green sheets for outer layers, on each of which the internal electrode pattern and the ceramic paste layer are not formed, are stacked, then the ceramic green sheets on each of which the internal electrode pattern and the ceramic paste layer are formed are successively stacked thereon, and then another predetermined number of ceramic green sheets for outer layers are stacked thereon, to fabricate a mother stacked body. The mother stacked body may be compression-bonded in the stacking direction by isostatic pressing, for example.

Thereafter, the mother stacked body is cut along cutting lines, and thus unfired stacked bodies are cut out. Accordingly, corner portions and ridge portions of the stacked bodies may be rounded by barrel finishing or the like.

Each unfired stacked body is fired. As a result, stacked body 10 including internal electrode layers 21 provided therein is fabricated. The firing temperature may be set according to the dielectric material and conductive component, and is preferably about 900° C. or more and about 1300° C. or less, for example. The ceramic green sheets, the internal electrode conductive paste, and the ceramic paste are fired simultaneously.

The external electrode conductive paste is applied to first end surface 15 of stacked body 10 and is baked to form a base electrode layer for first external electrode 51, and the external electrode conductive paste is applied to the second end surface and is baked to form a base electrode layer for second external electrode 52. The baking temperature is preferably about 700° C. or more and about 900° C. or less, for example.

The external electrode conductive paste for forming the base electrode layers for first external electrode 51 and second external electrode 52 includes a conductive material.

By applying the external electrode conductive paste including the conductive material to first end surface 15 and second end surface 16 of stacked body 10 and baking it, the base electrode layers are formed entirely or substantially entirely on first end surface 15 and the second end surface. Accordingly, the fine conductive material is sintered preferentially on surfaces of internal electrode layers 21, and thus densified portions 51a and densified portions 52a are able to be formed.

As the external electrode conductive paste for forming the densified portions, an external electrode conductive paste including copper particles having an average particle diameter of less than or equal to about 0.7 μm is preferable, for example.

As the conductive material included in the external electrode conductive paste, a conductive material that is the same as or similar to the conductive component included in the internal electrode conductive paste may preferably be used.

A plating layer is formed on the surface of the base electrode layer for first external electrode 51, and a plating layer is formed on the surface of the base electrode layer for second external electrode 52.

As described above, multilayer ceramic capacitor 1 shown in FIG. 1 is manufactured.

Another preferred embodiment of the multilayer ceramic capacitor of the present invention includes a stacked body including a plurality of dielectric layers and a plurality of internal electrode layers stacked alternately, and having a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the length direction; and external electrodes provided on the surfaces of the stacked body and electrically connected with the internal electrode layers, wherein the dielectric layers have an average thickness that is less than or equal to about 3.4 times an average grain diameter of dielectric grains defining the dielectric layers; when the internal electrode layers are viewed in plan view from the stacking direction, the internal electrode layers each have an internal electrode main body portion that defines and functions as an effective region, and an internal electrode lead-out portion that leads out the internal electrode main body portion to the first end surface or the second end surface of the stacked body, and a length of the internal electrode lead-out portion in the width direction of the stacked body is less than or equal to about ½ of a length of the internal electrode main body portion; the internal electrode layer has a first region in which continuity of a conductive component defining the internal electrode layer is more than or substantially equal to a predetermined threshold value, and a second region in which continuity of the conductive component is less than the predetermined threshold value; a substantially central portion of the internal electrode main body portion is defined by the first region; at least a portion of the internal electrode lead-out portion is defined by the second region; when the internal electrode main body portion is equally or substantially equally divided into five regions in the length direction, in a cut surface along which the stacked body is cut in a direction that is parallel or substantially parallel to the length direction and the stacking direction and is perpendicular or substantially perpendicular to the width direction, at an end portion of the internal electrode main body portion closer to the first side surface, and the regions are set as a region La, a region Lb, a region Lc, a region Ld, and a region Le in order from the first end surface, continuity of the conductive component of the internal electrode layer in the region Lc is higher than continuity of the conductive component of the internal electrode layer in each of the region La and the region Lb; and when the internal electrode main body portion is equally or substantially equally divided into five regions in the length direction, in a cut surface along which the stacked body is cut in the direction that is parallel or substantially parallel to the length direction and the stacking direction and is perpendicular or substantially perpendicular to the width direction, at each of a position shifted by about 20 μm from the end portion of the internal electrode main body portion closer to the first side surface toward the second side surface and a central position of the internal electrode main body portion in the width direction, continuity of the conductive component of the internal electrode layer in a region closer to the first end surface is lower than continuity of the conductive component of the internal electrode layer in a substantially central region of the internal electrode main body portion.

Hereinafter, an Example of the multilayer ceramic capacitor will be described. It should be noted that the preferred embodiments of the present invention are not limited to only this Example.

First, a ceramic green sheet mainly including barium titanate, an internal electrode conductive paste, and a ceramic paste mainly including barium titanate were prepared.

The ceramic green sheet having a thickness of about 0.7 μm was sheet-molded by a doctor blade method or the like, with a dielectric paste including ceramic particles having an average particle diameter of about 150 nm. An Ni conductive paste, which was the internal electrode conductive paste, was applied on the ceramic green sheet to have the shape shown in FIG. 5, to form an internal electrode pattern. Further, a ceramic paste was applied on the ceramic green sheet around the internal electrode pattern without overlapping a peripheral edge portion of the internal electrode pattern. Thereby, the ceramic green sheet having the internal electrode pattern formed thereon was provided.

The internal electrode conductive paste was supplied from a paste supply port provided at a predetermined position onto the ceramic green sheet. However, the paste supply port described above was prepared by displacing the position of a paste supply port that allows the internal electrode conductive paste to be substantially uniformly provided to a predetermined region, to decrease the amount of supply of the internal electrode conductive paste to an outer peripheral portion of a region to define and function as an internal electrode main body portion.

One hundred and nineteen ceramic green sheets, on each of which the internal electrode pattern was formed, were stacked and lead-out positions were located alternately at opposite end surfaces. Further, a predetermined number of ceramic green sheets for outer layers, on each of which the internal electrode pattern and a ceramic paste layer were not formed, were stacked on each of the top and the bottom of the ceramic green sheets, and the entire stacked ceramic green sheets were compression-bonded by rubber, to fabricate a mother stacked body.

The mother stacked body was cut at predetermined positions, and thus was divided into unfired stacked bodies. Thereafter, each unfired stacked body was fired, and external electrodes were formed on the fired body, to fabricate a multilayer ceramic capacitor. Dielectric layers defining the multilayer ceramic capacitor had an average thickness of about 0.5 μm, and the number of internal electrode layers was 119. In addition, dielectric grains defining the dielectric layers had an average grain diameter of about 150 nm to about 250 nm.

To form the external electrodes, a Cu paste including glass was applied and baked, and thereafter Ni plating and Sn plating were performed.

The multilayer ceramic capacitor including the external electrodes had external dimensions of a length of about 250 μm, a width of about 130 μm, and a height of about 130 μm.

A multilayer ceramic capacitor was fabricated by the same or substantially the same procedure as in Example 1, except for changing the thickness of the ceramic green sheets and uniformly applying the internal electrode conductive paste on the ceramic green sheets by screen printing.

Dielectric layers defining the multilayer ceramic capacitor had an average thickness of about 0.7 μm, and the number of internal electrode layers was 41.

The multilayer ceramic capacitor had the same or substantially the same external dimensions as those of the multilayer ceramic capacitor in accordance with Example 1.

The multilayer ceramic capacitors in accordance with Example 1 and Comparative Example 1 were cut along a cross section A, a cross section A', and a cross section B in FIG. 5, and cut surfaces were observed with a SEM to provide line coverages.

Figure 8:
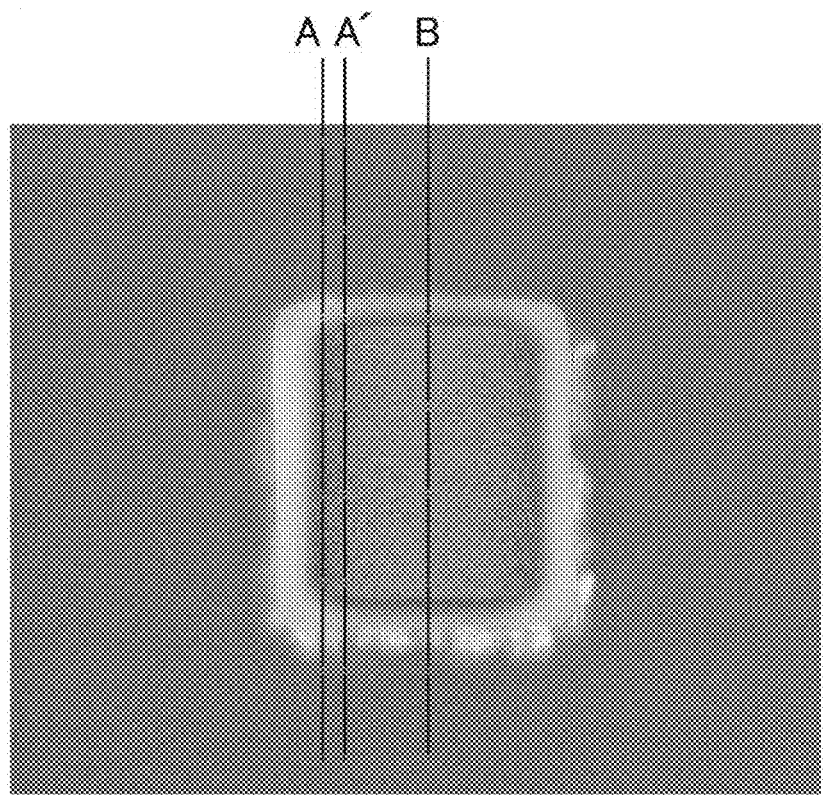
FIG. 8 is a SEM image of a WT cross section showing positions that expose LT cross sections in a multilayer ceramic capacitor in accordance with an Example 1.

FIG. 8 is a SEM image of a WT cross section showing positions that expose LT cross sections in the multilayer ceramic capacitor in accordance with Example 1. The multilayer ceramic capacitors in accordance with Example 1 and Comparative Example 1 were cut at positions shown in FIGS. 5 and 8 to expose the LT cross sections. Cross section A is at the position of an end portion of each internal electrode layer in the width direction, cross section A' is at the position shifted inward by about 20 μm from cross section A, and cross section B is at the central position of the stacked body in the width direction.

Then, a region in which the internal electrode layers faced each other, which defined and functioned as an effective portion, was determined from each of the provided LT cross sections, the region was equally or substantially equally divided into five regions in the length direction of the stacked body, and line coverages in region La, region Lb, and region Lc were measured.

Figure 9:
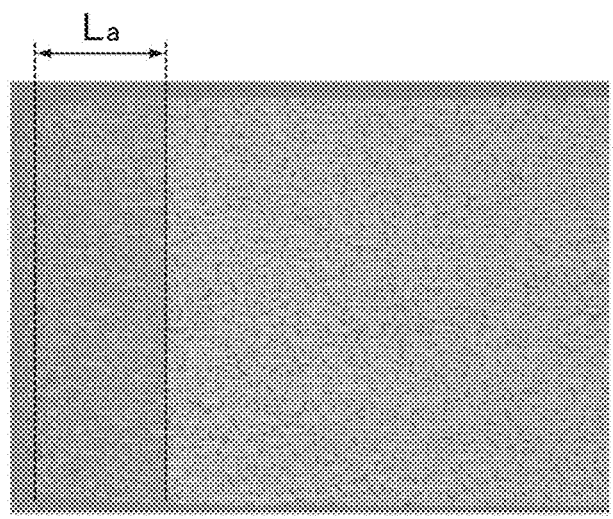
FIG. 9 is a SEM image showing a region La of the multilayer ceramic capacitor in accordance with Example 1.
Figure 10:
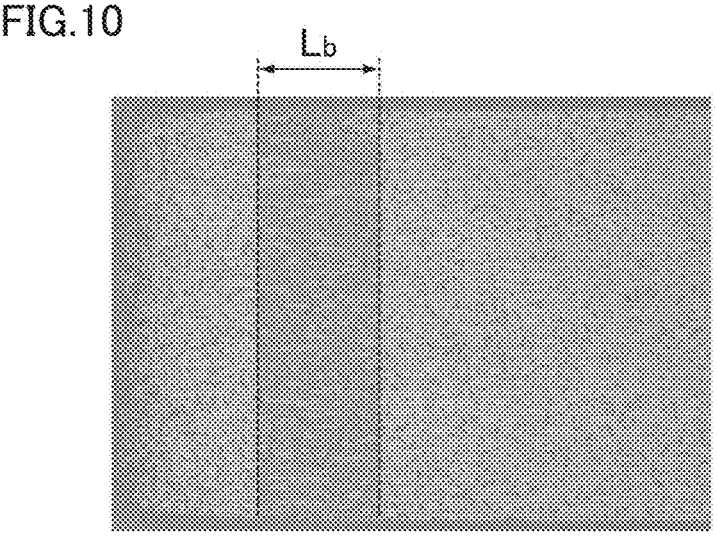
FIG. 10 is a SEM image showing a region Lb of the multilayer ceramic capacitor in accordance with Example 1.
Figure 11:
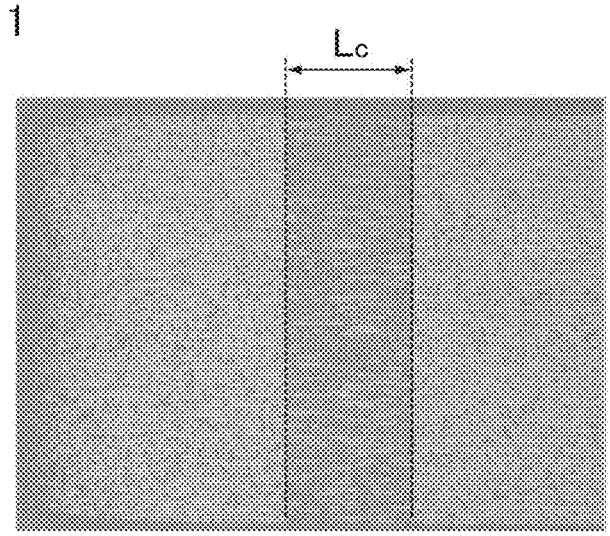
FIG. 11 is a SEM image showing a region Lc of the multilayer ceramic capacitor in accordance with Example 1.

FIG. 9 is a SEM image showing region La of the multilayer ceramic capacitor in accordance with Example 1, FIG. 10 is a SEM image showing region Lb of the multilayer ceramic capacitor in accordance with Example 1, and FIG. 11 is a SEM image showing region Lc of the multilayer ceramic capacitor in accordance with Example 1. However, any of FIGS. 9, 10, and 11 shows a cross section cut along cross section B shown in FIGS. 5 and 8.

In each of region La, region Lb, and region Lc, line coverages of the internal electrode layers were measured, and an average value thereof was calculated. Table 1 shows the results.

region La, and at least a portion of the internal electrode lead-out portion is defined by the second region.

It was confirmed that both the multilayer ceramic capacitor in accordance with Example 1 and the multilayer ceramic capacitor in accordance with Comparative Example 1 satisfied an average value of measured values of insulation resistance of about 1 [GΩ,], as a value representing insulation reliability.

Thus, in the multilayer ceramic capacitor in accordance with Example 1, the thickness of the dielectric layers was able to be decreased while providing insulation reliability comparable to the insulation reliability of a conventional multilayer ceramic capacitor having thick dielectric layers.

Therefore, multilayer ceramic capacitors according to preferred embodiments of the present invention are each able to provide an insulation resistance comparable to a conventional insulation resistance, even when the dielectric layers have a thin thickness.

The multilayer ceramic capacitor in accordance with Example 1 was cut in a direction perpendicular or substantially perpendicular to the length direction at a substantially central portion of the stacked body in the length direction to provide a WT cross section, and the WT cross section was observed with a SEM to confirm the cross sectional shape of

TABLE 1

|  |  | Region La | | Region Lb | | Region Lc | |
| --- | --- | --- | --- | --- | --- | --- | --- |
|  |  | Line Coverage [%] | Region | Line Coverage [%] | Region | Line Coverage [%] | Region |
| Example 1 | Cross Section A | 58.9 | V | 73.8 | V | 58.9 | V |
|  | Cross Section A' | 75.4 | V | 86.7 | O | 88.0 | O |
|  | Cross Section B | 77.6 | V | 88.0 | O | 89.8 | O |
| Comparative Example 1 | Cross Section A | 72.3 | V | 78.8 | V | 80.3 | V |
|  | Cross Section A' | 92.8 | O | 95.8 | O | 95.3 | O |
|  | Cross Section B | 91.5 | O | 95.3 | O | 95.5 | O |

Since the results in Table 1 show that the value of the line coverage in region Lc of cross section B provided by cutting the stacked body at the center or substantially the center in the width direction was about 89.8% in Example 1 and about 95.5% in Comparative Example 1, the value of the line coverage defining and functioning as a threshold value to distinguish between the first region and the second region was determined as about 80.8% in Example 1 and about 86.0% in Comparative Example 1. In Table 1, the first region is indicated by "O", and the second region is indicated by "V".

It was confirmed that the measured value of the line coverage in region Lc of cross section B was the maximum value in all measured values, and was higher than the values of the line coverages in region La, region Lb, and region Lc of cross section A. Thus, in the multilayer ceramic capacitor in accordance with Example 1, a substantially central portion of the internal electrode main body portion is defined by the first region.

Figure 12:
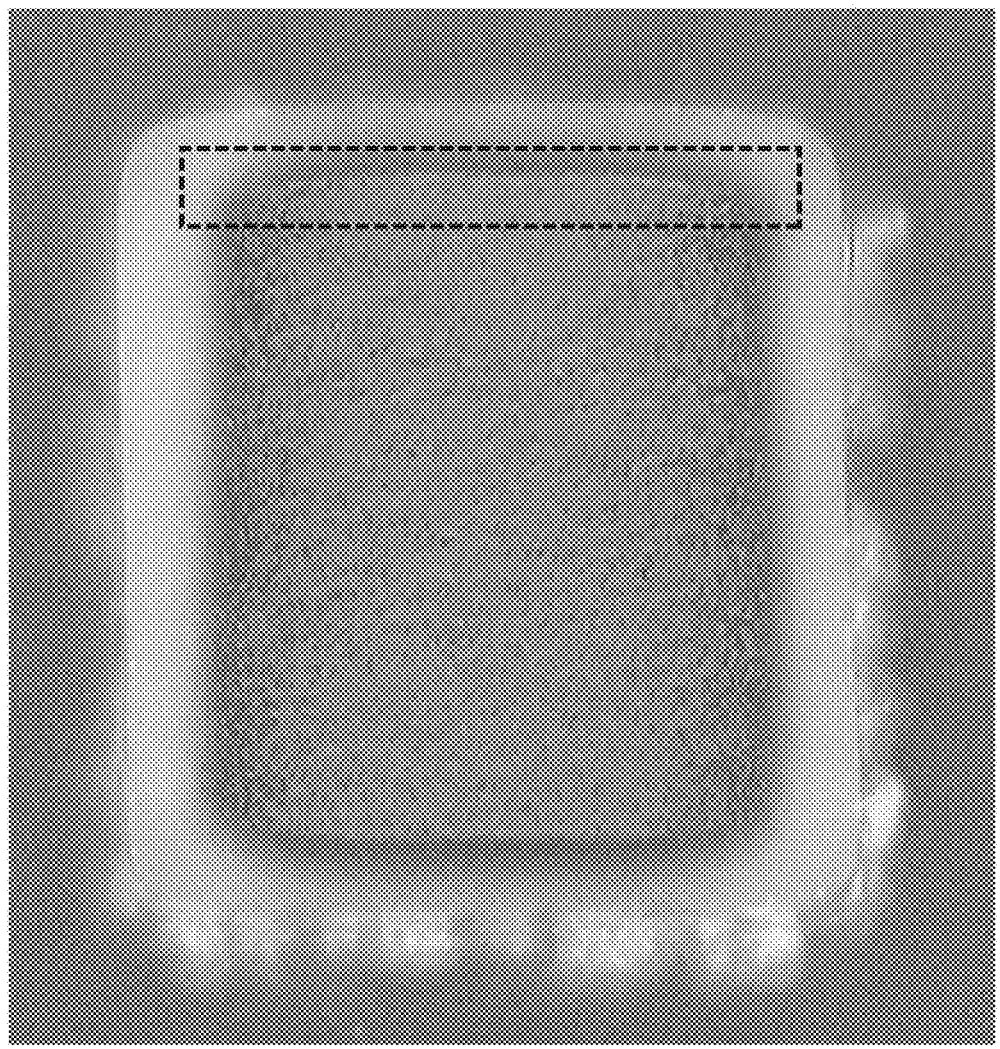
FIG. 12 is a SEM image of the WT cross section of the multilayer ceramic capacitor in accordance with Example 1.
Figure 13:
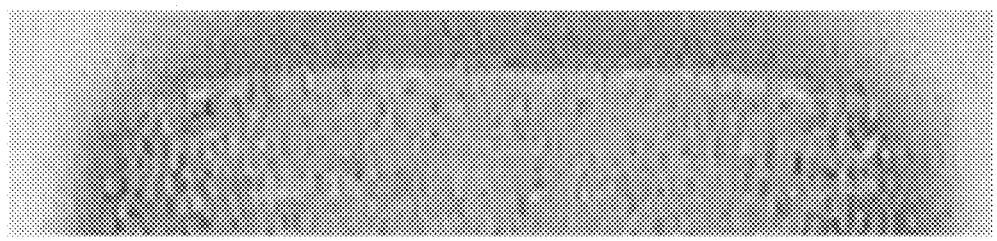
FIG. 13 is an enlarged view enlarging an upper portion of FIG. 12 in an upward/downward direction.

In addition, in each of cross section A, cross section A', and cross section B of the multilayer ceramic capacitor in accordance with Example 1, the line coverage in region La is lower than the line coverages in region Lb and region Lc. Thus, according to an estimation, the line coverage of an internal electrode lead-out portion that leads out the internal electrode main body portion to the first end surface or the second end surface of the stacked body is also low as that in the internal electrode layer (internal electrode main body portion). FIGS. 12 and 13 show the results.

FIG. 12 is a SEM image of the WT cross section of the multilayer ceramic capacitor in accordance with Example 1, and FIG. 13 is an enlarged view enlarging an upper portion of FIG. 12 in an upward/downward direction.

As shown in FIGS. 12 and 13, in the multilayer ceramic capacitor in accordance with Example 1, the internal electrode main body portion has an M shape including a bent portion in a cross section of the stacked body in the direction perpendicular or substantially perpendicular to the length direction.

The multilayer ceramic capacitors in accordance with Example 1 and Comparative Example 1 were cut in a direction orthogonal or substantially orthogonal to the length direction at a central point of each stacked body in the length direction, and cut surfaces were observed with a SEM to provide line coverages. Table 2 shows the results.

Figure 14:
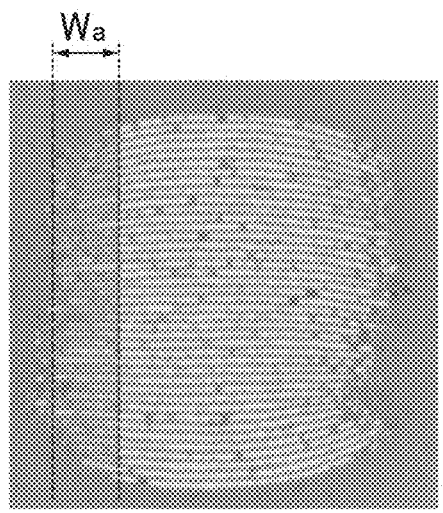
FIG. 14 is a SEM image showing a region Wa of a multilayer ceramic capacitor in accordance with a Comparative Example 1.
Figure 15:
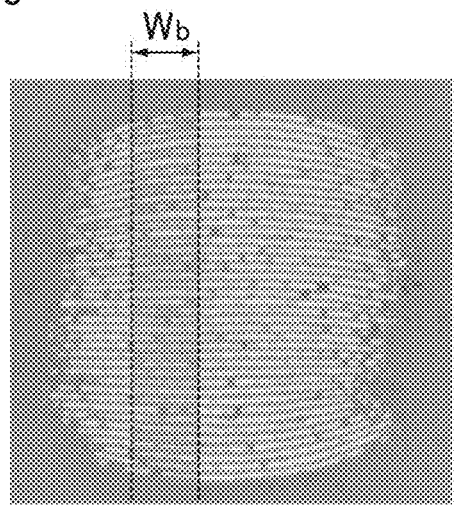
FIG. 15 is a SEM image showing a region Wb of the multilayer ceramic capacitor in accordance with Comparative Example 1.
Figure 16:
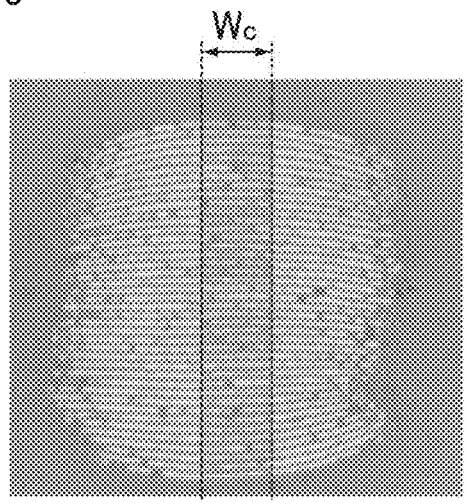
FIG. 16 is a SEM image showing a region Wc of the multilayer ceramic capacitor in accordance with Comparative Example 1.

FIG. 14 is a SEM image showing region Wa of the multilayer ceramic capacitor in accordance with Comparative Example 1, FIG. 15 is a SEM image showing region Wb of the multilayer ceramic capacitor in accordance with Comparative Example 1, and FIG. 16 is a SEM image showing region Wc of the multilayer ceramic capacitor in accordance with Comparative Example 1. However, any of FIGS. 14, 15, and 16 shows a WT cross section cut at the central point of the stacked body in the length direction.

TABLE 2

| | Region Wa | | Region Wb | | Region Wc | | Rate of Change from |
| --- | --- | --- | --- | --- | --- | --- | --- |
| | Line Coverage [%] | Region | Line Coverage [%] | Region | Line Coverage [%] | Region | Region Wa to Region Wc |
| Example 1 | 48.2 | V | 88.4 | O | 91.8 | O | 1.90 |
| Comparative Example 1 | 56.1 | V | 92.8 | O | 95.5 | O | 1.70 |

The results in Table 2 show that the value of the line coverage in region Wc of the cross section provided by cutting the stacked body at substantially the center in the length direction was about 91.8% in Example 1 and about 95.5% in Comparative Example 1. The value of the line coverage defining and functioning as the threshold value to distinguish between the first region and the second region is about 80.8% in Example 1 and about 86.0% in Comparative Example 1, as determined from the results in Table 1. In Table 2, the first region is indicated by "O", and the second region is indicated by "V".

In addition, the results in Table 2 also show that, in Example 1, the value of the line coverage gradually increases from region Wa through region Wb to region Wc. In contrast, in Comparative Example 1, although the value of the line coverage also gradually increases from region Wa through region Wb to region Wc, the rate of change of the value of the line coverage is lower than that in Example 1, and the rate of change of the line coverage from region Wa to region Wc in Comparative Example 1 is about 1.70 times, and the rate of change in Example 1 is about 1.90 times. In region Wa close to an end portion of each internal electrode layer, the measured value of the line coverage in Example 1 is about 48.2%, which is lower than about 56.1% in Comparative Example 1. In addition, the rate of change of the line coverage from region Wa close to the end portion of each internal electrode layer to region Wc located at substantially the center of each internal electrode layer in Example 1 is about 1.90, which is higher than about 1.70 in Comparative Example 1. That is, the line coverage at the end portion relative to the line coverage at the central portion in Example 1 is relatively lower than that in Comparative Example 1. Thereby, it is estimated that the influence of the presence or absence of the conductive component adjacent to or in a vicinity of the end portion of the internal electrode layer in the multilayer ceramic capacitor is able to be reduced more in Example 1, when compared with Comparative Example 1.

As a conventional technique, a multilayer ceramic capacitor in accordance with a Reference Example 1 was fabricated, by using the same or substantially the same dimensions as those of the multilayer ceramic capacitor in accordance with Example 1, with a dielectric paste and an internal electrode conductive paste identical or similar to the dielectric paste and the internal electrode conductive paste for the multilayer ceramic capacitor in accordance with Example 1, and changing manufacturing conditions to set the thickness of dielectric layers to about 0.5 μm. It should be noted that, in Reference Example 1, the internal electrode conductive paste was uniformly applied on the ceramic green sheets, by a conventional technique.

Although line coverages in the multilayer ceramic capacitor in accordance with Reference Example 1 were measured, no significant variation was observed between regions. Thus, internal electrode layers defining the multilayer ceramic capacitor in accordance with Reference Example 1 do not include the first region and the second region.

One hundred values of insulation resistance of each of the multilayer ceramic capacitors in accordance with Example 1 and Reference Example 1 were measured to determine the maximum value, the minimum value, the average value, and the standard deviation of insulation resistance. Table 3 shows values calculated by converting the values of insulation resistance by a common logarithm $\log_{10}$.

It should be noted that, when the value calculated by converting the average value of measured values of insulation resistance [Ω] by common logarithm $\log_{10}$ was more than or equal to about 9, that is, when the value of insulation resistance was more than or equal to about 1 GΩ, it was determined that a sufficient insulation resistance was provided.

TABLE 3

| | Values Calculated by Converting Insulation Resistance Values [Ω] by Common Logarithm $\log_{10}$ | | | |
| --- | --- | --- | --- | --- |
| | Average Value | Maximum Value | Minimum Value | Standard Deviation |
| Example 1 | 10.03 | 10.45 | 9.01 | 0.28 |
| Reference Example 1 | 8.86 | 9.72 | 6.07 | 0.77 |

The results in Table 3 show that, in the multilayer ceramic capacitor in accordance with Example 1, the average of the insulation resistance values was more than or equal to about 1 [GΩ], even when the dielectric layers had a thin thickness, for example, less than or equal to about 0.5 μm. Thus, it was confirmed that the multilayer ceramic capacitor in accordance with Example 1 had a sufficient insulation resistance. In addition, in Example 1, there was little variation in insulation resistance value between samples, and it was confirmed that even a sample having the lowest insulation resistance value had a sufficient insulation resistance.

In contrast, in the multilayer ceramic capacitor in accordance with Reference Example 1, the average value of measured values of insulation resistance was less than about 1 GΩ, when the dielectric layers had a thin thickness, for example, less than or equal to about 0.5 μm, and the insulation resistance was not sufficient. In addition, a significant variation in insulation resistance value between samples was confirmed. From the above results, the multilayer ceramic capacitor is able to significantly reduce or prevent a reduction in insulation resistance by applying the features of the preferred embodiments of the present invention thereto, even when the multilayer ceramic capacitor has a height dimension (T dimension) of less than or equal to about 143 μm, the width dimension of the internal electrode lead-out portion is less than or equal to about ½ of the width dimension of the internal electrode main body portion, and the dielectric layers have an average thickness of less than or equal to about 0.5 μm.

What is claimed is:

1. A multilayer ceramic capacitor comprising:
a stacked body including a plurality of dielectric layers and a plurality of internal electrode layers stacked alternately, and having a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the length direction; and
external electrodes provided on the surfaces of the stacked body and electrically connected with the internal electrode layers; wherein
the dielectric layers have an average thickness of less than or equal to about 0.5 μm;
when the internal electrode layers are viewed in plan view from the stacking direction, the internal electrode layers each include an internal electrode main body portion that defines and functions as an effective region, and an internal electrode lead-out portion that leads out the internal electrode main body portion to the first end surface or the second end surface of the stacked body, and a length of the internal electrode lead-out portion in the width direction of the stacked body is less than or equal to about ½ of a length of the internal electrode main body portion;
the internal electrode layer includes a first region in which a continuity of a conductive component defining the internal electrode layer is higher than a continuity of the conductive component in a second region;
a substantially central portion of the internal electrode main body portion is defined by the first region; and
at least a portion of the internal electrode lead-out portion is defined by the second region.

2. The multilayer ceramic capacitor according to claim 1, wherein a distance from the first end surface or the second end surface to the internal electrode main body portion is less than or equal to about 25 μm.

3. The multilayer ceramic capacitor according to claim 1, wherein a distance from the first side surface or the second side surface to the internal electrode main body portion is less than or equal to about 15 μm.

4. The multilayer ceramic capacitor according to claim 1, wherein a thickness of the internal electrode layer in the second region is smaller than a thickness of the internal electrode layer in the first region.

5. The multilayer ceramic capacitor according to claim 1, wherein the internal electrode main body portion has an M shape or substantially an M shape in a cross section of the stacked body in a direction perpendicular or substantially perpendicular to the length direction.

6. The multilayer ceramic capacitor according to claim 1, wherein
the external electrodes each include densified portions having a higher ratio of a conductive component defining the external electrode than non-densified portions of the external electrodes, and a lower void ratio than the non-densified portions; and
the densified portions are continuously provided at portions of the external electrode in contact with the internal electrode layers.

7. The multilayer ceramic capacitor according to claim 1, wherein the continuity of the conductive component is a line coverage.

8. The multilayer ceramic capacitor according to claim 1, wherein internal electrode layers of the plurality of internal electrode layers that are adjacent to or in a vicinity of the first end surface and the second end surface are deformed toward a center in the stacking direction.

9. The multilayer ceramic capacitor according to claim 1, wherein the average thickness of the dielectric layers is more than or equal to about 0.1 μm.

10. The multilayer ceramic capacitor according to claim 1, the dielectric layers include a dielectric ceramic.

11. The multilayer ceramic capacitor according to claim 1, the average thickness of the dielectric is between about 1.3 times and about 4.7 times an average particle diameter of a dielectric material of the dielectric layers.

12. The multilayer ceramic capacitor according to claim 1, wherein the internal electrode layers include a conductive component and dielectric particles.

13. The multilayer ceramic capacitor according to claim 1, wherein an average thickness of the internal electrode layers is between about 0.3 μm and about 30 μm.

14. A multilayer ceramic capacitor comprising:
a stacked body including a plurality of dielectric layers and a plurality of internal electrode layers stacked alternately, and having a first main surface and a second main surface opposite to each other in a stacking direction, a first end surface and a second end surface opposite to each other in a length direction orthogonal or substantially orthogonal to the stacking direction, and a first side surface and a second side surface opposite to each other in a width direction orthogonal or substantially orthogonal to the stacking direction and the length direction; and
external electrodes provided on the surfaces of the stacked body and electrically connected with the internal electrode layers; wherein
the dielectric layers have an average thickness that is less than or equal to about 3.4 times an average grain diameter of dielectric grains defining the dielectric layers;
when the internal electrode layers are viewed in plan view from the stacking direction, the internal electrode layers each include an internal electrode main body portion that defines and functions as an effective region, and an internal electrode lead-out portion that leads out the internal electrode main body portion to the first end surface or the second end surface of the stacked body, and a length of the internal electrode lead-out portion in the width direction of the stacked body is less than or equal to about ½ of a length of the internal electrode main body portion;
the internal electrode layer includes a first region in which continuity of a conductive component defining the internal electrode layer is more than or substantially equal to a threshold value, and a second region in which continuity of the conductive component is less than the threshold value;
a substantially central portion of the internal electrode main body portion is defined by the first region;
at least a portion of the internal electrode lead-out portion is defined by the second region;

when the internal electrode main body portion is equally or substantially equally divided into five regions in the length direction, in a cut surface along which the stacked body is cut in a direction that is parallel or substantially parallel to the length direction and the stacking direction and is perpendicular or substantially perpendicular to the width direction, at an end portion of the internal electrode main body portion closer to the first side surface, and the regions are set as a region La, a region Lb, a region Lc, a region Ld, and a region Le in order from the first end surface, continuity of the conductive component of the internal electrode layer in the region Lc is higher than continuity of the conductive component of the internal electrode layer in each of the region La and the region Lb; and when the internal electrode main body portion is equally or substantially equally divided into five regions in the length direction, in a cut surface along which the stacked body is cut in the direction that is parallel or substantially parallel to the length direction and the stacking direction and is perpendicular or substantially perpendicular to the width direction, at each of a position shifted by about 20 μm from the end portion of the internal electrode main body portion closer to the first side surface toward the second side surface and a central position of the internal electrode main body portion in the width direction, continuity of the conductive component of the internal electrode layer in a region closer to the first end surface is lower than continuity of the conductive component of the internal electrode layer in a substantially central region of the internal electrode main body portion.

15. The multilayer ceramic capacitor according to claim 14, wherein a distance from the first end surface or the second end surface to the internal electrode main body portion is less than or equal to about 25 μm.

16. The multilayer ceramic capacitor according to claim 14, wherein a distance from the first side surface or the second side surface to the internal electrode main body portion is less than or equal to about 15 μm.

17. The multilayer ceramic capacitor according to claim 14, wherein a thickness of the internal electrode layer in the second region is smaller than a thickness of the internal electrode layer in the first region.

18. The multilayer ceramic capacitor according to claim 14, wherein the internal electrode main body portion has an M shape or substantially an M shape in a cross section of the stacked body in a direction perpendicular or substantially perpendicular to the length direction.

19. The multilayer ceramic capacitor according to claim 14, wherein
the external electrodes each include densified portions having a higher ratio of a conductive component defining the external electrode than non-densified portions of the external electrodes, and a lower void ratio than the non-densified portions; and
the densified portions are continuously provided at portions of the external electrode in contact with the internal electrode layers.

20. The multilayer ceramic capacitor according to claim 14, wherein the continuity of the conductive component is a line coverage.

* * * * *